United States Patent [19]
Hayes

[11] Patent Number: 5,995,215
[45] Date of Patent: Nov. 30, 1999

[54] AUTOCOLLIMATOR WITH GRATING

[75] Inventor: John B. Hayes, Tucson, Ariz.

[73] Assignee: Wyko Corporation, Tucson, Ariz.

[21] Appl. No.: 08/889,675

[22] Filed: Jul. 8, 1997

[51] Int. Cl.$^6$ .................................................. G01B 11/26

[52] U.S. Cl. ............................................................ 356/153

[58] Field of Search .................................. 356/153, 139.1

[56] References Cited

U.S. PATENT DOCUMENTS

| | | | |
|---|---|---|---|
| 3,730,610 | 5/1973 | Lissberger | 350/162 |
| 4,500,200 | 2/1985 | Kleinhans | 356/152 |
| 5,110,210 | 5/1992 | Fay et al. | 356/150 |
| 5,513,000 | 4/1996 | Smith et al. | 356/152.2 |

OTHER PUBLICATIONS

Eugene Hecht, "Optics," Addison–Wesley Publishing Company, Second Edition, pp. 79–81 and Chapter 10.

*Primary Examiner*—Frank G. Font
*Assistant Examiner*—Zandra V. Smith
*Attorney, Agent, or Firm*—Antonio R. Durando

[57] ABSTRACT

An optical crossed grating is used to calibrate a conventional autocollimator operated with a single-frequency light source. Since a collimated monochromatic beam is diffracted at a number of well known angles after being reflected from the grating, an array of spots is formed on the detector surface that makes it possible to calibrate the autocollimator in a single operation. Because the angle of the diffracted light is determined only by the spacing in the grid, the calibration accuracy is insensitive to temperature variations and to the position of the grid on the sample stage. The calibration scaling values are calculated simply by measuring the spot spacings on the detector surface in relation to the diffraction angles corresponding to the grid spacing.

18 Claims, 6 Drawing Sheets

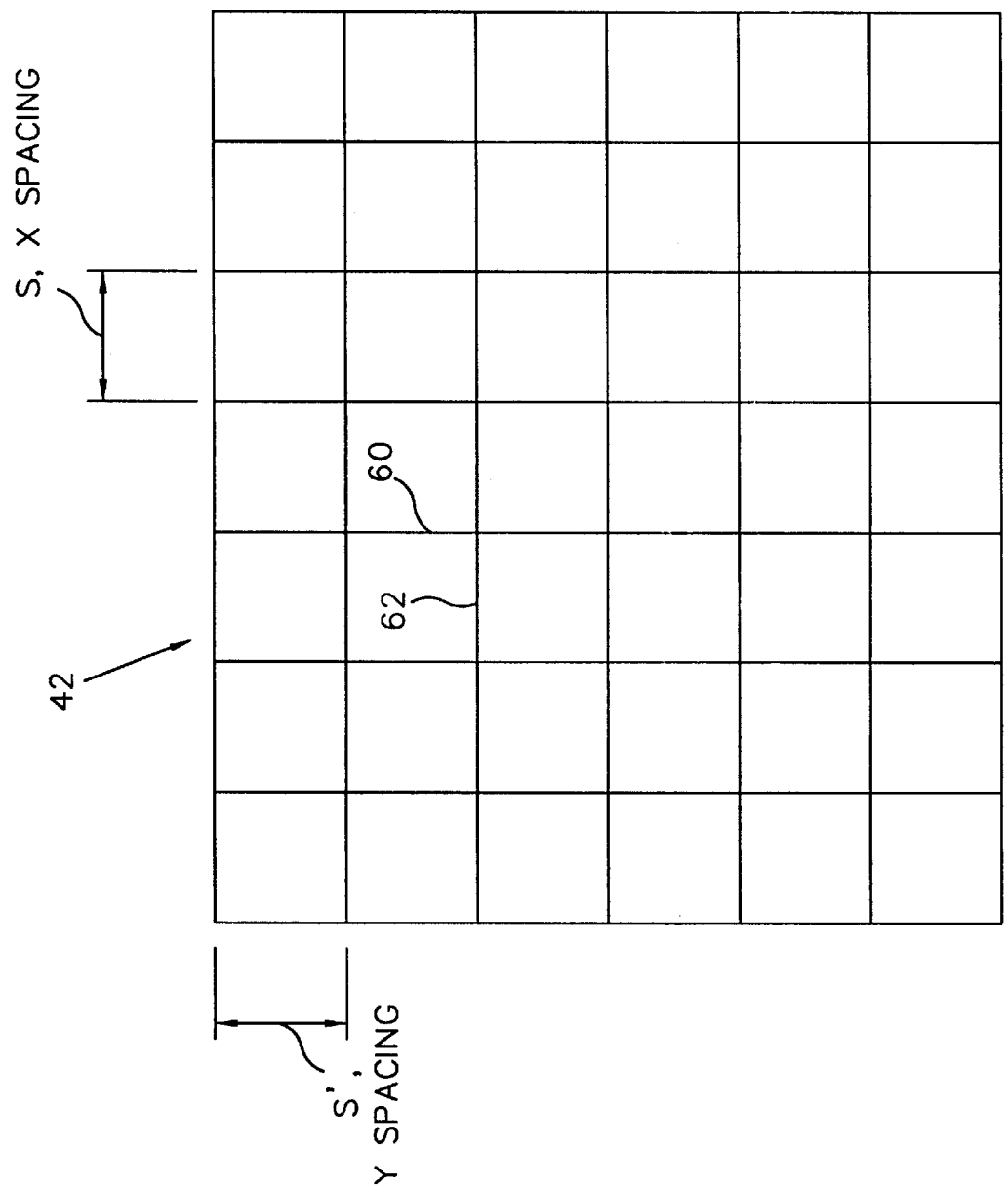

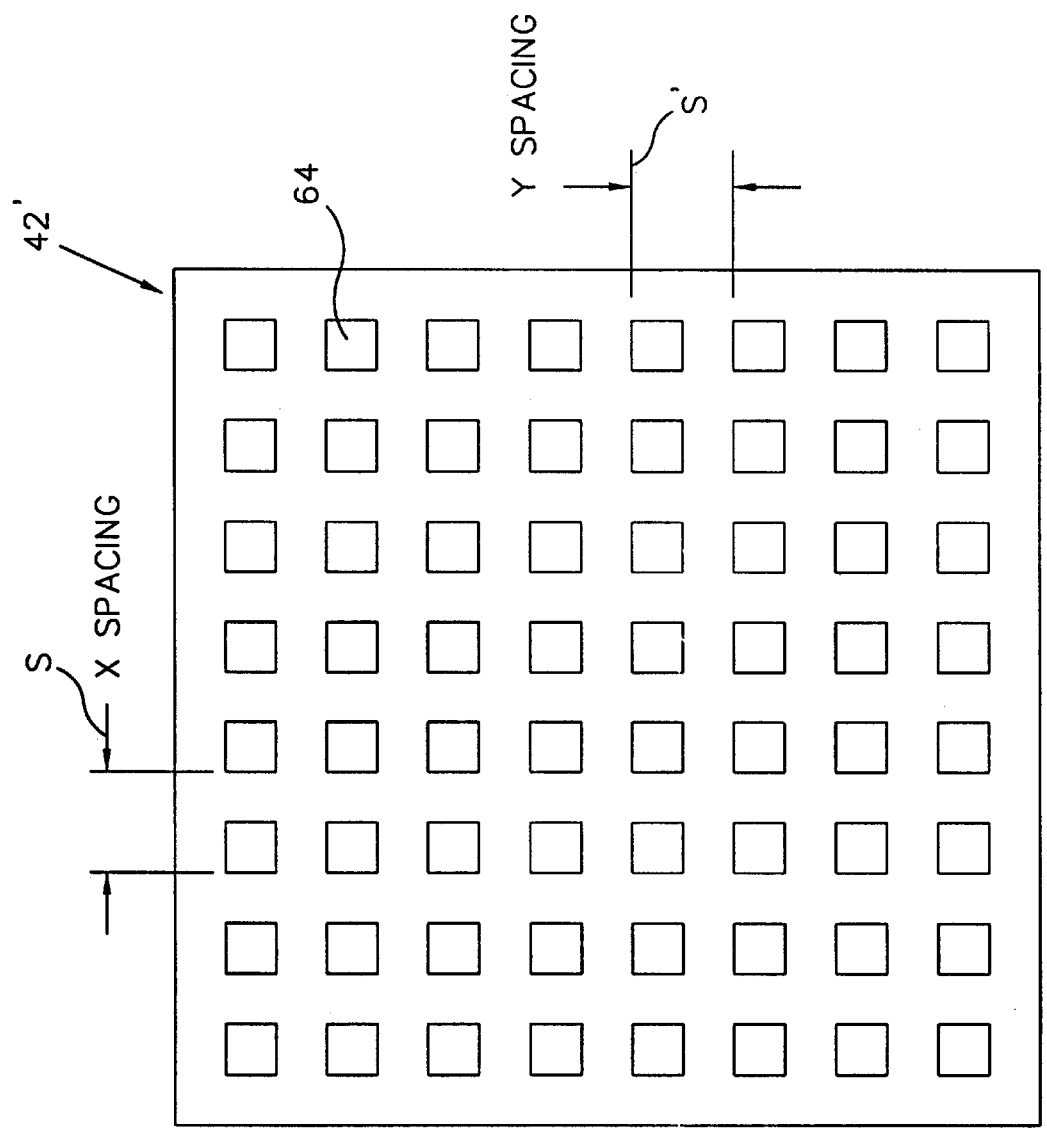

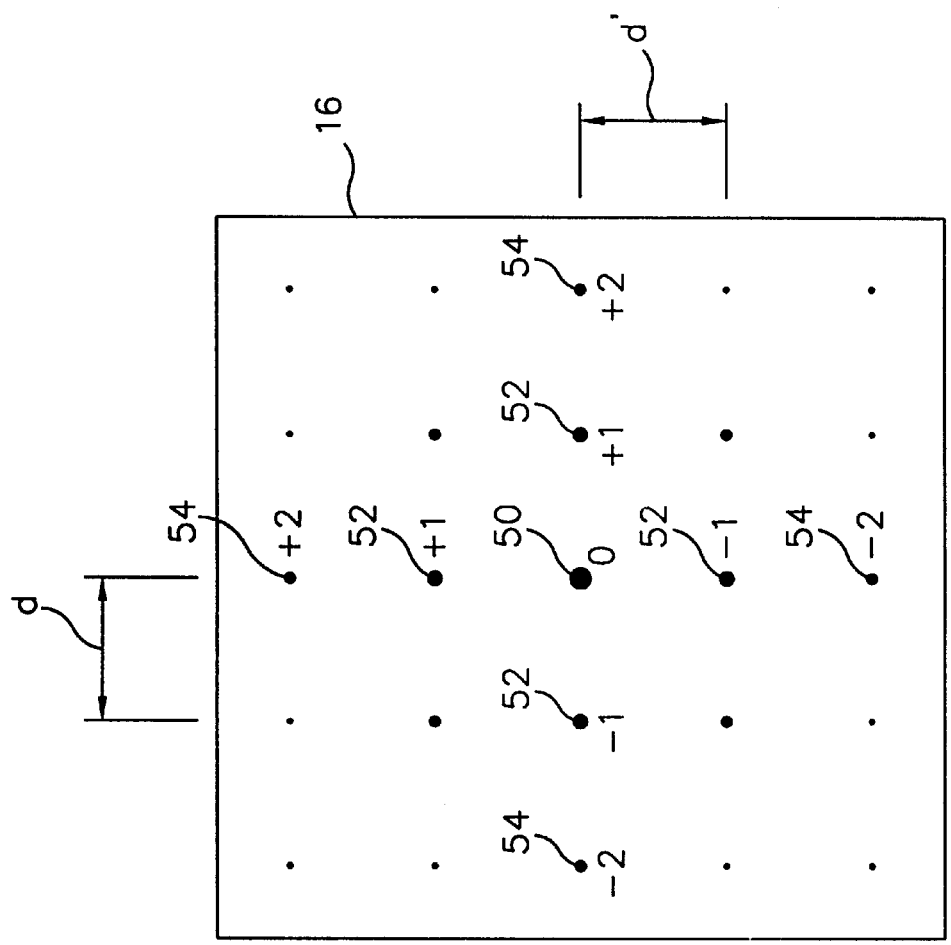

AUTOCOLLIMATOR WITH GRATING

BACKGROUND OF THE INVENTION

1. Field of the Invention

This invention is related in general to apparatus for measuring angles. In particular, the invention consists of a novel device for calibrating autocollimators.

2. Description of the Related Art

Autocollimators are optical instruments used to measure angles. For instance, for quality control purposes it is often necessary to know the exact angle of a flat surface with respect to a reference plane, such as the surface of a slider in a read/write computer drive head. The part to be tested is placed on a sample stage or mounting fixture, which is illuminated by a light source in the autocollimator, and the angle is determined by the position of the reflected light focused by a lens on a light detector.

A typical autocollimator system 10, well known in the art, is illustrated in FIG. 1, where a light source 12 produces a beam L of collimated light that is partially reflected by a beamsplitter 14 toward a reflective test surface or mirror S. The return light reflected from the surface S is passed through the beamsplitter and focussed on the surface of a detector 16 by a focussing lens 18. A variable attenuator 20 may also be used, if necessary.

Thus, the autocollimator 10 is employed to measure the angle of the reflective surface S with respect to a reference plane. In practice, the mirror surface S serves as sample stage, or is coplanar to it, and provides the reference plane with respect to which a test surface is measured. As those skilled in the art readily understand, there is direct relationship between the angle of the test surface S and the location of the point on the detector 16 where the reflected light is focussed. For small angles (less than about 5 degrees) the relationship is substantially linear. This relationship is normally referred to as the scaling factor of the instrument, which is used to determine the angle of the tested surface as a function of the position of the reflected light on the detector. Since the scaling factor is affected by environmental conditions that may cause slight deviations from the rated performance, autocollimators require periodic calibration. The preferable practice in the art is to calibrate the instrument periodically, often before each measurement session.

FIG. 1 illustrates the shift of an image focussed on the detector 16 as a result of an angle introduced in the sample surface S. For the purposes of this disclosure, the x and y directions are taken to define a horizontal plane substantially perpendicular to the light incident to the reflective surface S and the z direction is the vertical dimension normal to that plane. An initial position P1 of the surface S is shown in solid line and a calibration position P2, after the surface S has been tilted by a known angle $\phi$, is shown in broken line. In practice, the angle $\phi$ in the test surface is provided by the introduction of a high-precision wedge 30 or sine bar placed on the sample stage of the instrument for the purpose of calibration, as illustrated in FIG. 2. These devices are commonly used in the art and are well known to users of autocollimators; therefore, they will not be described here.

FIGS. 1 and 2 are two-dimensional representations (in the x,z plane) of the light-path change introduced by a tilt of the reflective surface S with respect to the x axis. Obviously, calibration requires measurements with respect to angles introduced in at least two orthogonal directions (x,y measurements). Therefore, the same procedure must be repeated for an angle introduced with respect to the y axis and a total of at least four data points and corresponding measurements are required to calculate a scaling factor for both orthogonal coordinates. Assuming for simplicity of description that the sample surface S in its initial position P1 is perpendicular to the incident light beam LI, the reflected beam is coincident with the incident beam (that is, it is reflected with a 0 degree angle of reflection) and travels back through the beamsplitter 14 and the focusing lens 18 to form a high-intensity spot at a point 22 on the detector 16. When the angle $\phi$ is introduced in the sample surface S, the incident light LI is reflected at an angle $\alpha=2\phi$. The reflected beam LR travels back through the beamsplitter 14 and the focusing lens 18 and forms a spot at a point 24 on the detector 16 a distance d from the original point 22. As those skilled in the art would readily recognized, for an autocollimator system having focal length f, the shift d is independent of the vertical position of the test surface and is equal to the product $(f)(\tan\phi)$. For a relatively large focal length f in comparison to the distance d (which results from small angles $\phi$), the linear relationship $d \approx f\phi$ is substantially true. Thus, an x scaling factor is readily established by this equation for the x direction. By repeating the measurements with a tilt in the y direction (normal to the first set of measurements), a y scaling factor is similarly determined, thereby providing the necessary information for calibration. A computer coupled to the autocollimator system can be used to perform the necessary calculations in a known manner.

The prior-art procedure for calibrating autocollimators suffers from several drawbacks that affect its desirability and reliability. The precision of calibration is completely dependent on the quality of the wedges or sine-bar devices utilized to introduce an angle in the test surface; any imperfection in the flatness of the surfaces may cause errors in the calculation of the scaling factors, which in turn would result in imperfect angle measurements. The use of either device requires its placement in intimate contact with the flat surface of the sample stage in the autocollimator; given the extreme precision needed for a good measurement, dirt, dust, or even fingerprints may prevent good surface contact and produce erroneous calibration measurements. The sample stage of autocollimators is typically very small, in the order of centimeters, while commercial wedges and sine bars are materially larger and require some adaptation for use in calibrating autocollimators. At least two measurements are required for calibration in each orthogonal direction, for a total of four measurements, which typically take 5 to 30 minutes to accomplish, a substantial amount of time. Finally, the accuracy of calibration is affected by temperature changes in the gauge blocks, which can occur as a result of being handled by an operator carrying out the procedure.

It is noted that autocollimators are manufactured according to specific design parameters that provide corresponding design scaling factors. If all the physical parameters of the instrument were known exactly and were unaffected by environmental conditions, the scaling factors could be calculated precisely from those parameters. In practice, though, the design scaling factors provide only an approximation that is not suitable for the level of precision typically required by users of autocollimators. Therefore, there is still a need for an improved method and device for calibrating conventional autocollimators.

BRIEF SUMMARY OF THE INVENTION

One primary objective of this invention is a device and method for calibrating a conventional autocollimator without the use of wedges or sine bars.

Another goal of the invention is a calibrating device and method that reduce the possibility of erroneous measurements as a result of dust or other particles that may prevent good surface contact.

Still another goal is a device and method that reduce the number of measurements necessary for calibration of a conventional autocollimator.

Another object is a device and method that make it possible to calibrate an autocollimator in a fraction of the time required by prior-art procedures.

Another objective is a mechanism that is suitable for incorporation in conventional autocollimator equipment.

Yet another objective is a mechanism that is insensitive to alignment.

Finally, an objective of this invention is a device that can be manufactured in an economical and commercially viable manner utilizing components that are either already available or can be constructed at reasonable cost.

Therefore, according to these and other objectives, the present invention consists of an optical crossed grating mounted on the sample stage of a conventional autocollimator operated with a single-frequency light source. Since a collimated monochromatic beam is diffracted at a number of well known angles after being reflected from the grating, an array of spots is formed on the detector surface that makes it possible to calibrate the autocollimator in a single operation. Because the angle of the diffracted light is determined only by the spacing in the grid, the calibration accuracy is insensitive to temperature variations and to the position of the grid on the sample stage. The calibration scaling values are calculated simply by measuring the spot spacings on the detector surface in relation to the diffraction angles corresponding to the grid spacing.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 4 is an example of a two-dimensional crossed-wire amplitude grating used to implement the concept of the present invention.

FIG. 5 is an example of a two-dimensional crossed phase grating also used to implement the concept of the present invention.

FIG. 6 is an illustration of the grid pattern produced on the light detector of an autocollimator by a monochromatic beam refracted by a crossed grating according to the invention.

DESCRIPTION OF THE PREFERRED EMBODIMENT OF THE INVENTION

The principal inventive aspect of this disclosure lies in the idea of using a reflection crossed grating with a monochromatic light source to calibrate a conventional autocollimator. The resulting light behavior, as predicted by the well known grating equation based on Huygens' principle, yields a direct relationship between the angles of diffraction produced by the reflection grating and the spacings of the spots in the grid projected on the light detector.

It is known that a wavefront of light reflected from a grating produces wavelets radiated with different phases over the grating surface. An emerging wavefront therefore contains periodic variations in its shape that are equivalent to an angular distribution of the constituent plane waves. (See Eugene Hecht, "Optics," Addison-Wesley Publishing Company, Second Edition, pp. 79–81 and Chapter 10.) The angle of diffraction θ of each wavefront is related to the uniform spacing s between diffracting elements in the grating according to the grating equation $$\sin \theta = n\lambda/s \qquad (1)$$

where n is the diffractive order number of the wavefront and λ is the light's wavelength. From this relation it is readily apparent that light of known wavelength can be reflected from a grating and produce wavefronts at different angles of diffraction precisely determined by the separation between the diffractive elements in the grating. Therefore, a crossed grating provides a device for precisely generating reflected light wavefronts that produce intensity maxima at known angles of reflection and these wavefronts in turn can be used to produce an array of points of maximum intensity on the light detector. By judiciously selecting the separation s between the diffractive elements in the grating (both in the x and y dimensions), an array of light spots is produced that is suitable for detection and measurement on the light detector of an autocollimator.

Figure 1:
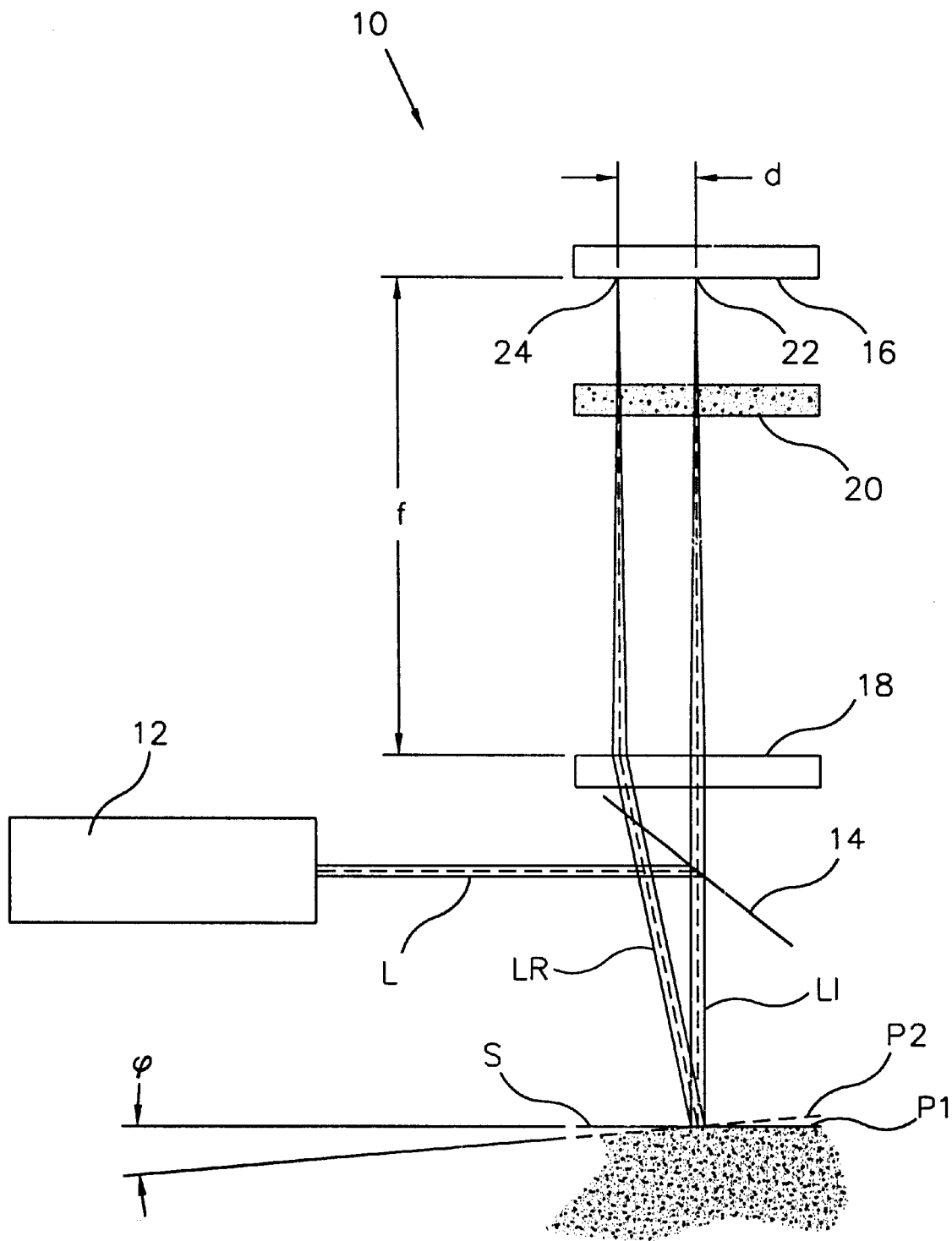
FIG. 1 is a schematic representation of a conventional autocollimator system.
Figure 2:
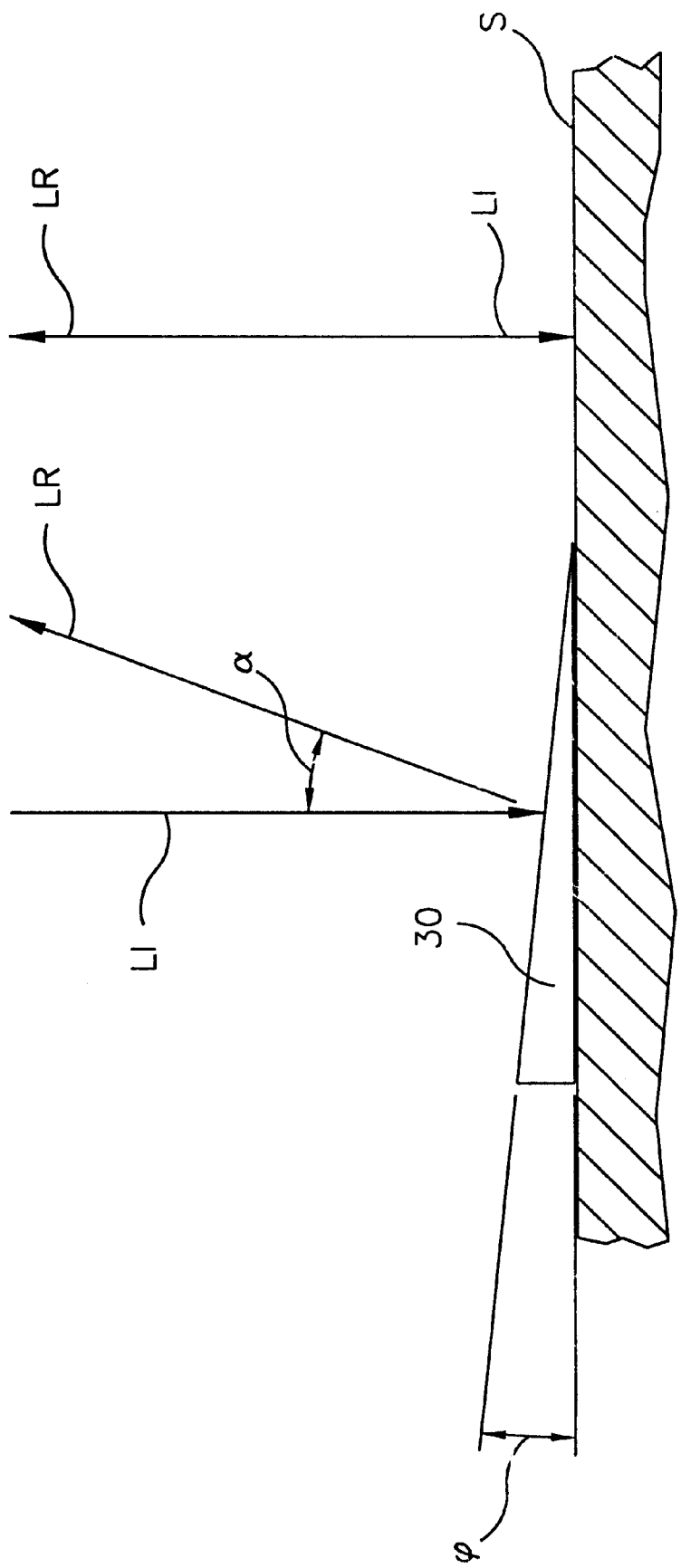
FIG. 2 is an illustration of a precision wedge mounted on the reflective surface of an autocollimator to provide a known angle of reflection to an incident beam of collimated light.
Figure 3:
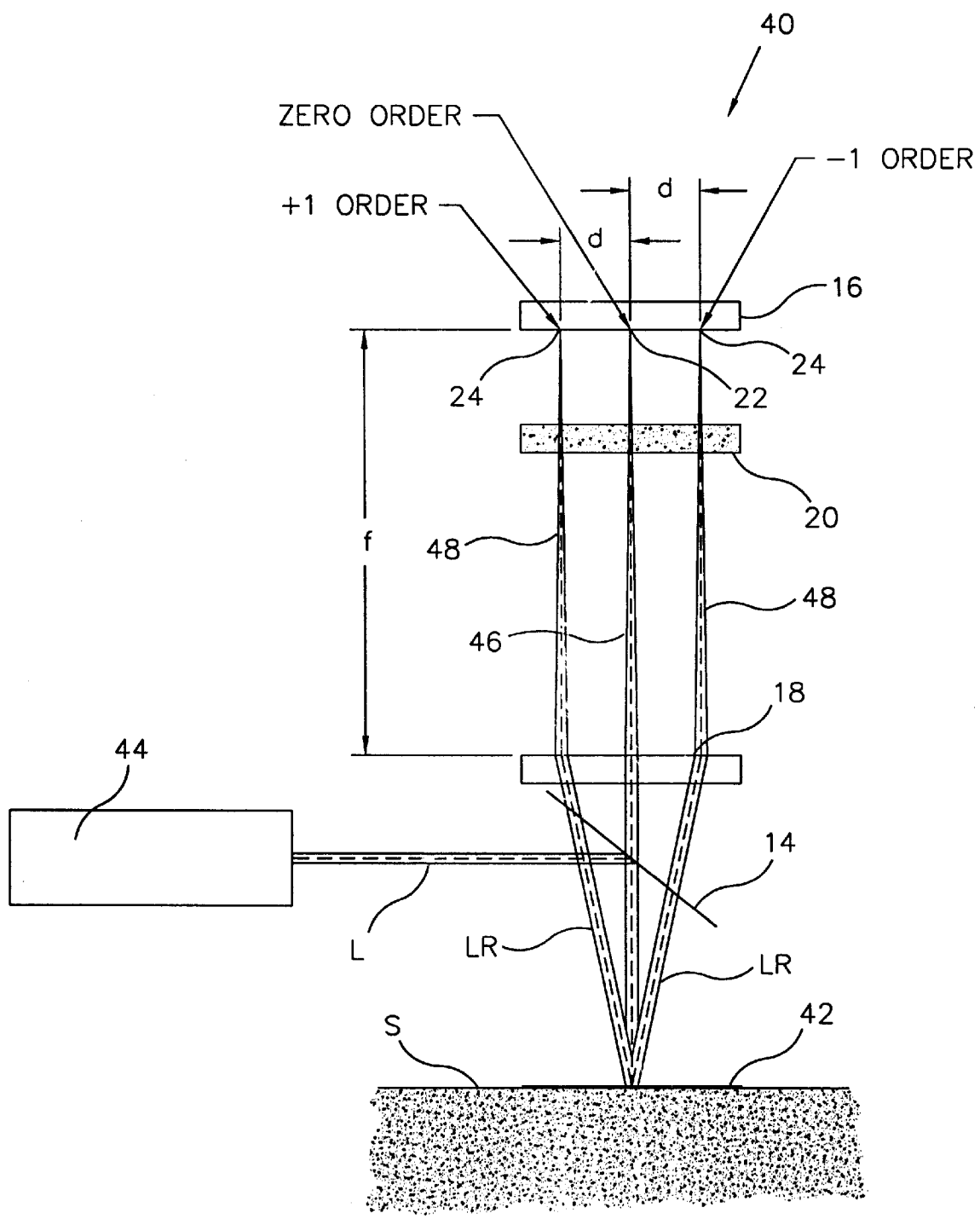
FIG. 3 is schematic representation of an autocollimator with a crossed grating for calibration according to the present invention.

FIG. 3 illustrates an embodiment 40 of the invention where a reflective grating 42 is used for calibrating a conventional autocollimator system. The collimated monochromatic light beam L produced by a source 44, such as a single-mode laser, is reflected by the grating 42 producing multiple reflected wavefronts with different angles of diffraction and intensity. As those skilled in the art readily understand, the reflected light produces a wavefront 46 of diffractive order zero and maximum intensity, and wavefronts 48 of diffractive order one and smaller intensity. Additional higher order wavefronts (not shown in the figure) are also generated at lower intensities and greater diffraction angles; therefore, they may or may not be visible on the surface of the detector 16. The illuminated spots 22 and 24 on the light detector 16 corresponding to the wavefronts 46 and 48 are separated by a distance d that is linearly related to the angle of diffraction by the equation $$d = (f)(\tan \theta), \qquad (2)$$

where f is the focal length of the autocollimator and θ is the angle of diffraction of the wavefront with diffractive order one. Therefore, a scaling factor for the instrument is readily established by the relation between the angle θ and the distance d.

By utilizing a crossed grating with uniformly spaced diffractive elements in the x and y directions, such as illustrated in FIGS. 4 and 5, the reflected light produces symmetric wavefronts with decreasing intensity as the diffractive order increases, yielding an array of illuminated spots on the light detector 16, as illustrated in FIG. 6. As well understood in the art, the central spot 50 is brightest and corresponds to the zero-order diffraction wavefront 46, as indicated in the figure by the subscript to the spot. The four weaker spots 52, a distance d from the central spot 50, correspond to four first-order wavefronts 48. Similarly, the four still-lighter spots 54 correspond to second-order diffraction wavefronts; and so on.

From FIG. 6 it is readily apparent that a single measurement with a reflective grating 42 according to the invention yields a scaling factor for both the x and y axes at the same time. The distance d between collinear spots in the x direction produces the calibrated value of the x scaling factor in relation to the diffraction angle θ produced by the grating with respect to the x axis, which is a known value. Similarly, the distance d' between collinear spots in the y direction produces the calibrated value of the y scaling factor, which is also related to the diffraction angle θ produced by the grating with respect to the y axis, which is a known value. Preferably, as illustrated in FIGS. 4 and 5, the spacings s and s' between the horizontal and vertical diffracting elements, respectively, are the same, so that the corresponding distances d and d' between the spots produced on the detector surface 14 (FIG. 6) are also substantially the same. It is understood, though, that the principle of the invention is equally applicable for variable spacings in the x and y directions of the grating.

In practice, any type of crossed reflective grating can be used to calibrate a conventional autocollimator. FIG. 4 shows a crossed wire embodiment 42, where the diffractive elements consist of wire sections 60 and 62 diffracting the incident light with respect to the x and y axes, respectively. An equivalent embodiment 42' consists of uniformly spaced bumps 64 that produce phase modulation in the incident light and a corresponding diffraction at angles determined by the spacings s,s' between bumps. A spacing of approximately 20 microns is suitable for conventional autocollimators with a focal length of about 10 cm when a monochromatic light with wavelength of about 670 nm is used. These parameters produce a diffraction angle of 1.920 degrees, which in turn yields a distance d of about 3.352 mm between illuminated spots on the detector surface, which is suitable for producing an array of at least 3×3 spots on a CCD camera with dimensions of 3.6×4.8 mm. In general, gratings with uniform spacings of about 14 microns to as much as 1 mm between diffractive elements, using wavelengths of about 500 to 1,000 nm that produce diffractive angles between $\frac{1}{16}°$ and 2°, $\frac{1}{4}°$ to 1° being preferred, are acceptable for practicing the invention with most standard autocollimators.

In operation, the spots 50,52,54 are detected by the conventional CCD video camera used in conjunction with autocollimators and the distances d and d' are computed automatically and combined with the corresponding angles of diffraction, which are known and are provided as inputs to the system, for calculating calibrated scaling factors. System software can be used to improve the calibration calculations, such as by averaging multiple measured distances between spots (obviously, values d in the x direction or d' in the y direction would be averaged, but not values between the two).

It is understood that the invention is described in terms of a monochromatic light source, such as a laser, but it could be practiced equivalently with white light and appropriate filters. Unfiltered white light produces similar results, and therefore it could also be used, but the spots would not be easily discernible on the detector. Therefore, the use of laser light is highly preferred.

Thus, the present invention provides a rapid device for calibrating an autocollimator. A single measurement, which can be carried out in a matter of seconds, suffices to produce x and y scaling factors. The gratings used can be smaller than one centimeter square, thereby fitting easily within the mounting fixture of a standard autocollimator. Finally, and very importantly from a practical point of view, the procedure is insensitive to the orientation of the grating in the fixture because a rotation of the grating results in a corresponding rotation of the grid produced on the detector, but the relative spacing is not affected. Once scaling factors with respect to the grating's diffractive elements are determined, corresponding scaling factors in the x and y directions can be calculated by mathematical procedures that are well known in the art.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. A method for calibrating an autocollimator that includes a source of collimated light, a reflective sample stage positioned along an optical path of the collimated light, a focussing lens positioned along an optical path of a light beam reflected from the sample stage, and a light sensor positioned substantially at a focal point of the focussing lens and adapted to detect the light beam reflected from the sample stage, said method comprising the following steps:

(a) placing a reflective grating in parallel alignment with the sample stage and within the optical path of collimated light, the reflective grating comprising diffractive elements uniformly spaced at a predetermined distance selected to produce wavefronts reflected at different angles of diffraction;

(b) passing the reflected wavefronts through the focussing lens so as to produce an array of points of maximum intensity on the light sensor; and (c) determining a scaling factor for the autocollimator based on a distance between a pair of adjacent points of maximum intensity detected on the light sensor and a corresponding angle of diffraction.

2. The method recited in claim 1, wherein said grating is a crossed grating and said step (c) consists of determining a first scaling factor for the autocollimator based on a first distance between a first pair of adjacent points of maximum intensity detected on the light sensor along a first direction and a corresponding first angle of diffraction, and determining a second scaling factor based on a second distance between a second pair of adjacent points of maximum intensity detected on the light sensor along a second direction and a corresponding second angle of diffraction, said first and second directions being orthogonal to one another.

3. The method recited in claim 2, wherein said crossed grating is a crossed wire grating.

4. The method recited in claim 2, wherein said crossed grating is a crossed phase grating.

5. The method recited in claim 1, wherein said source of collimated light comprises a monochromatic light source.

6. The method recited in claim 2, wherein said source of collimated light comprises a monochromatic light source.

7. The method recited in claim 6, wherein said monochromatic light source produces a light with a wavelength of about 500 nm to 1,000 nm and said crossed grating comprises diffractive elements uniformly spaced about 14 microns to 1 mm apart.

8. The method recited in claim 7, wherein said crossed grating is a crossed wire grating.

9. The method recited in claim 7, wherein said crossed grating is a crossed phase grating.

10. An autocollimator comprising the following components:
- a source of collimated light;
- a reflective sample stage positioned along an optical path of the collimated light;
- a two-dimensional reflective grating placed in parallel alignment with the sample stage and within the optical path of collimated light, the reflective grating comprising diffractive elements uniformly spaced at a predetermined distance selected to produce wavefronts reflected at different angles of diffraction;
- a focussing lens positioned along an optical path of a light beam reflected from the sample stage;
- a two-dimensional light sensor positioned substantially at a focal point of the focussing lens and adapted to detect the wavefronts reflected from the grating so as to produce an array of points of maximum intensity on the light sensor; and
- means for determining a scaling factor for the autocollimator based on a distance between a pair of adjacent points of maximum intensity detected on the light sensor and a corresponding angle of diffraction.

11. The autocollimator recited in claim 10, wherein said grating is a crossed grating.

12. The autocollimator recited in claim 11, wherein said crossed grating is a crossed wire grating.

13. The autocollimator recited in claim 11, wherein said crossed grating is a crossed phase grating.

14. The autocollimator recited in claim 10, wherein said source of collimated light comprises a monochromatic light source.

15. The autocollimator recited in claim 11, wherein said source of collimated light comprises a monochromatic light source.

16. The autocollimator recited in claim 15, wherein said monochromatic light source produces a light with a wavelength of about 500 nm to 1,000 nm and said crossed grating comprises diffractive elements uniformly spaced about 14 microns to 1 mm apart.

17. The autocollimator recited in claim 16, wherein said crossed grating is a crossed wire grating.

18. The autocollimator recited in claim 16, wherein said crossed grating is a crossed phase grating.

\* \* \* \* \*